United States Patent
Liao

(10) Patent No.: US 10,245,774 B2
(45) Date of Patent: Apr. 2, 2019

(54) BLOW-MOLDING PLASTIC BUBBLE-GENERATING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 186 days.

(21) Appl. No.: 15/416,867

(22) Filed: Jan. 26, 2017

(65) Prior Publication Data
US 2017/0326781 A1  Nov. 16, 2017

(30) Foreign Application Priority Data
May 16, 2016 (TW) .............................. 105207087 U

(51) Int. Cl.
| | |
|---|---|
| *B01F 3/04* | (2006.01) |
| *B29C 49/50* | (2006.01) |
| *B29C 49/00* | (2006.01) |
| *B29C 49/04* | (2006.01) |
| *B29C 49/48* | (2006.01) |

(52) U.S. Cl.
CPC .......... *B29C 49/50* (2013.01); *B01F 3/04099* (2013.01); *B01F 3/04106* (2013.01); *B01F 3/04241* (2013.01); *B29C 49/0031* (2013.01); *B29C 49/04* (2013.01); *B29C 2049/4805* (2013.01); *B29C 2049/503* (2013.01); *B29C 2793/0018* (2013.01); *B29C 2793/0045* (2013.01)

(58) Field of Classification Search
CPC .... B01F 3/04; B01F 3/04099; B01F 3/04106; B01F 2003/04184; B01F 3/04241
USPC ....................................................... 261/76, 77
See application file for complete search history.

(56) References Cited

U.S. PATENT DOCUMENTS 8,678,356 B2 * 3/2014 Iwaki .................. B01F 3/04539
261/87

* cited by examiner

*Primary Examiner* — Robert A Hopkins
(74) *Attorney, Agent, or Firm* — Muncy, Geissler, Olds & Lowe, P.C.

(57) ABSTRACT

A blow-molding plastic bubble-generating device is provided, including a board-like shell body. The board-like shell body is formed through blowing a hollow embryo placed in a mold, the hollow embryo is blown and expanded, the hollow embryo is penetrated through by a plurality of needle posts on an inner wall of the mold to form the board-like shell body, the board-like shell body is integrally formed and hollow and has a shell wall which completely and continuously surrounds the board-like shell body, and the shell wall has a plurality of through holes.

10 Claims, 11 Drawing Sheets

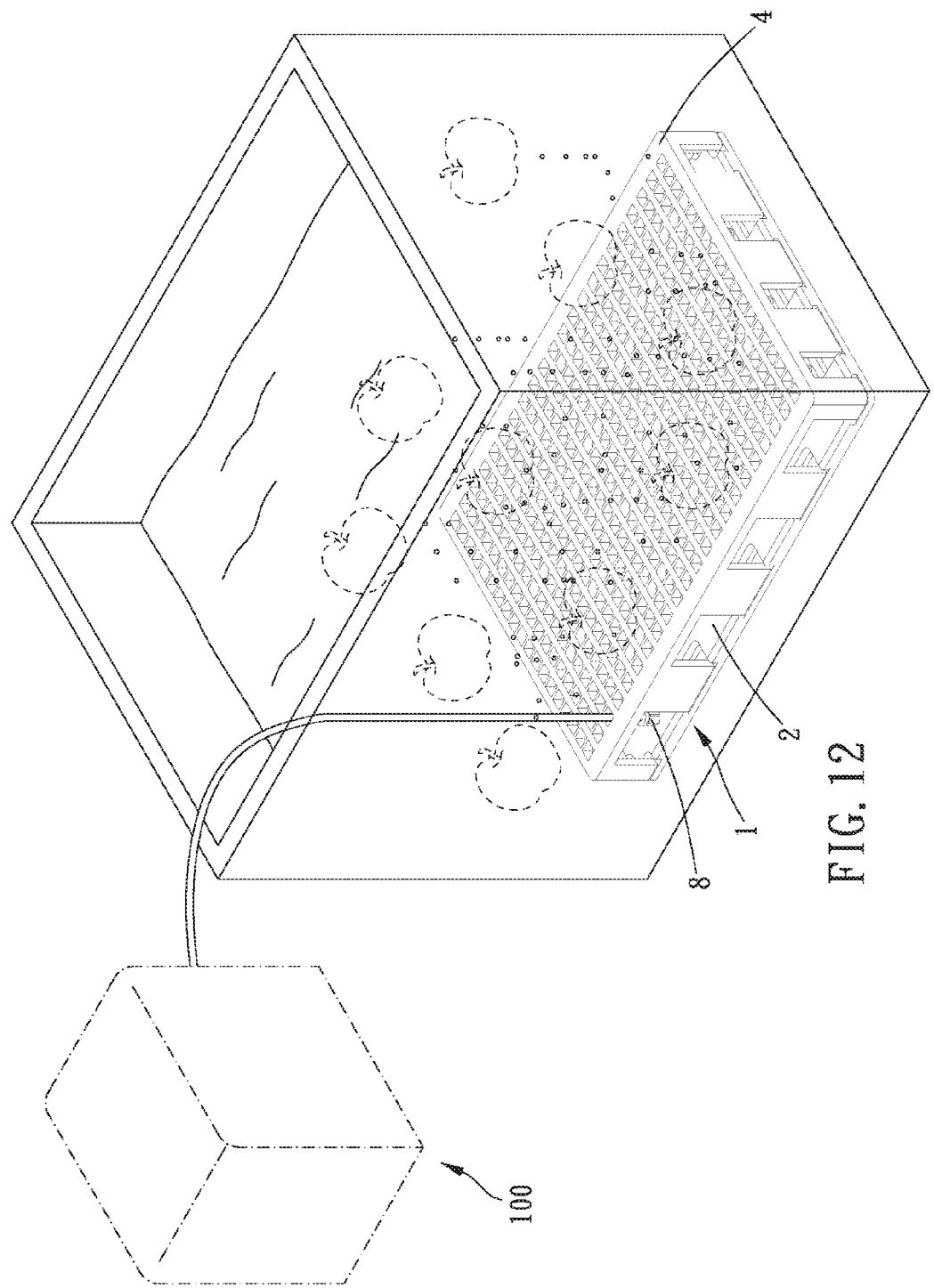

BLOW-MOLDING PLASTIC BUBBLE-GENERATING DEVICE

BACKGROUND OF THE INVENTION

Field of the Invention

The present invention relates to a bubble-generating device, and more particularly to a blow-molding plastic bubble-generating device.

Description of the Prior Art

Conventionally, when washing an object, one can brush and wash a surface of the object to and fro with a cleaning tool or immerse the object in a cleaning tank so as to remove dirt on the surface of the object.

However, the conventional cleaning method is done by human being, so a number of the objects which can be cleaned is small, and dirt hidden in small gaps cannot be removed through brushing. Therefore, it is time-consuming, energy-consuming and inefficient to wash the object in the conventional way.

The present invention has arisen to mitigate and/or obviate the afore-described disadvantages.

SUMMARY OF THE INVENTION

The major object of the present invention is to provide a blow-molding plastic bubble-generating device which can be put into water and manufacture a great number of bubbles. Through blow-molding, it is quick and cost-saving to manufacture a board-like shell body which is hollow and integrally formed and has a preferable performance.

To achieve the above and other objects, a blow-molding plastic bubble-generating device is provided, including a board-like shell body. The board-like shell body is formed through blowing a hollow embryo placed in a mold, the hollow embryo is blown and expanded, the hollow embryo is penetrated through by a plurality of needle posts on an inner wall of the mold to form the board-like shell body, the board-like shell body is integrally formed and hollow and has a shell wall which completely and continuously surrounds the board-like shell body, and the shell wall has a plurality of through holes.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 12 is a drawing showing an application of the preferred embodiment of the present invention.

DETAILED DESCRIPTION OF THE PREFERRED EMBODIMENTS

Figure 1:
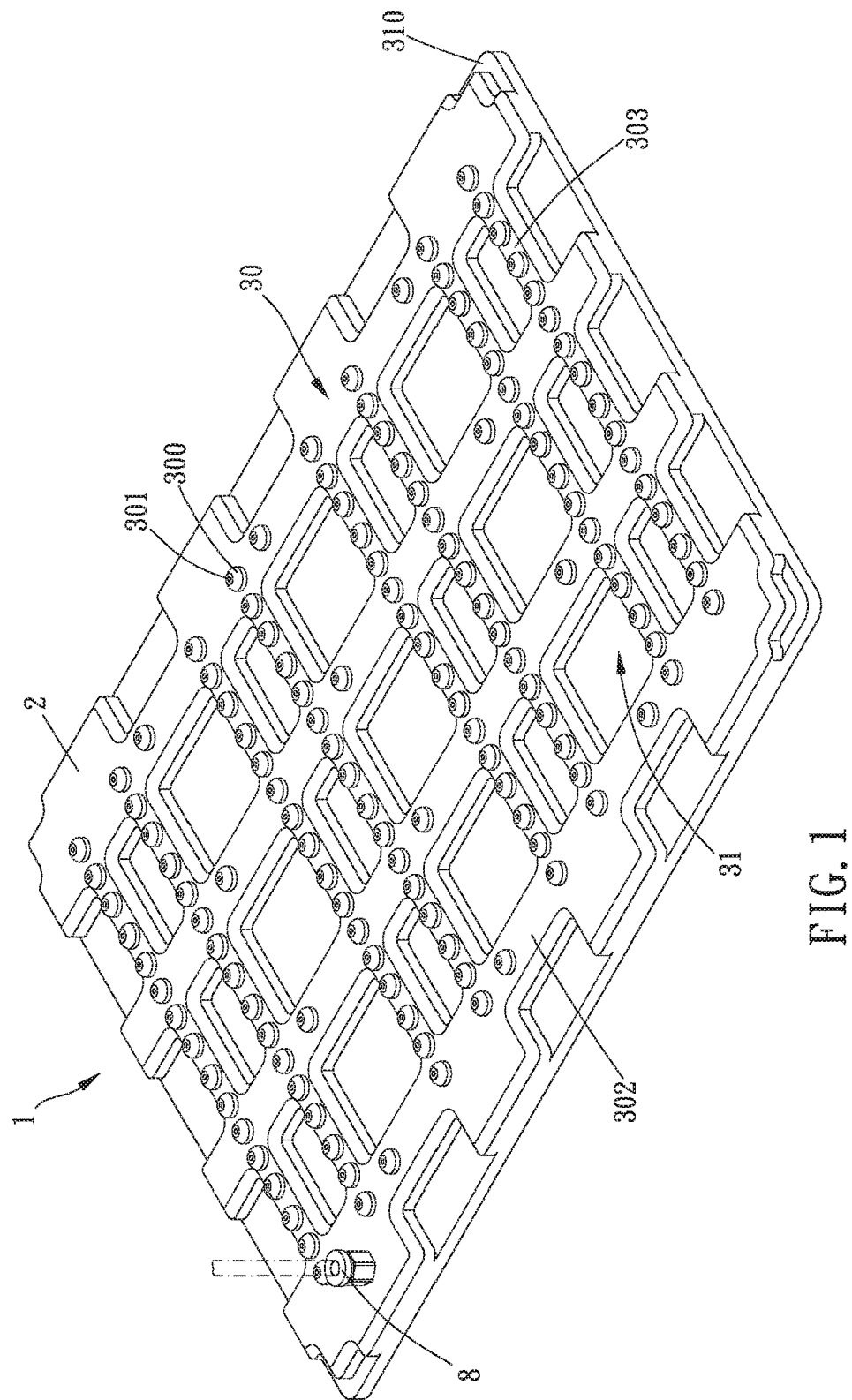
FIG. 1 is a stereogram of a preferred embodiment of the present invention.
Figure 2:
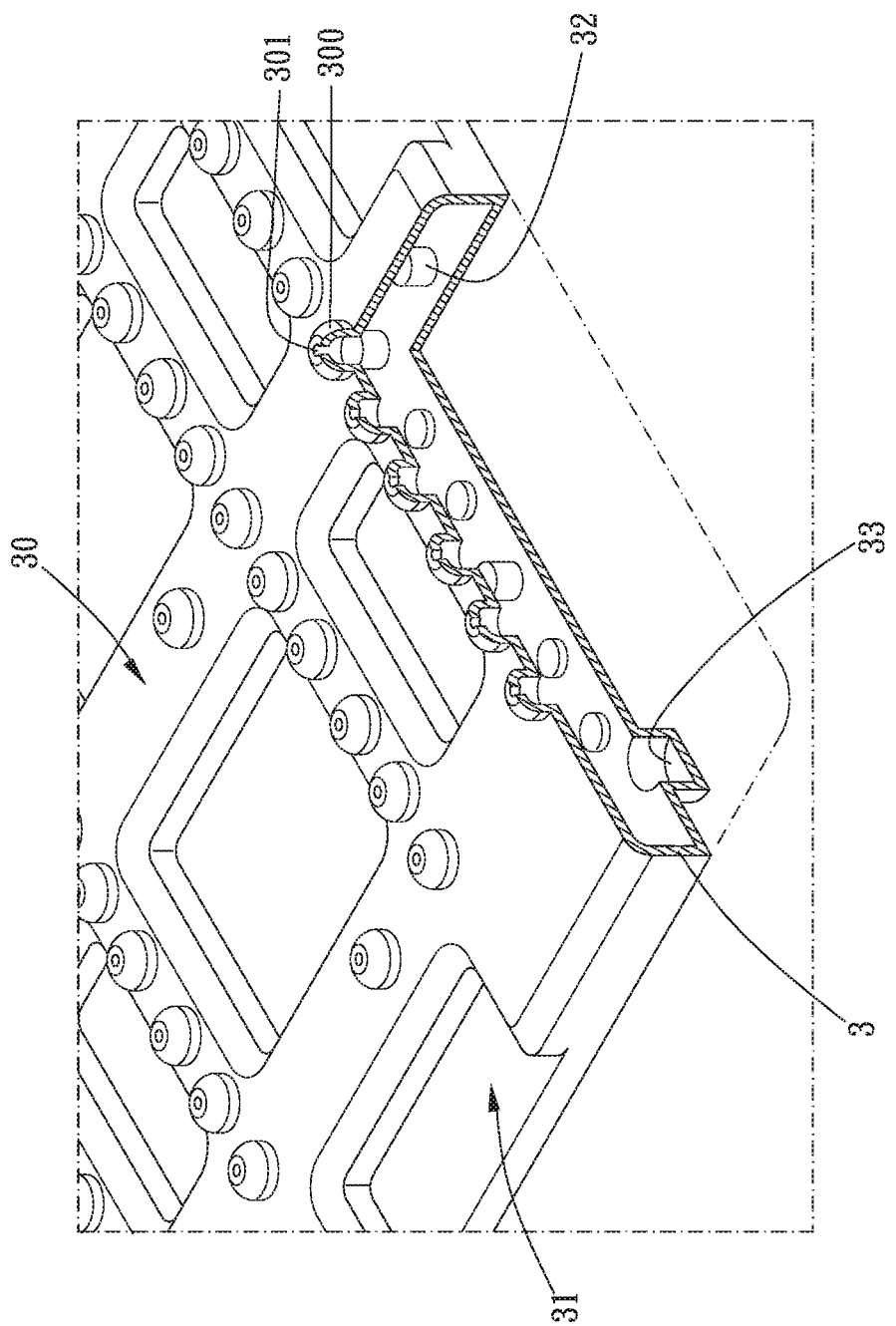
FIGS. 2 and 2A are partially-enlarged cross-sectional view of the preferred embodiment of the present invention.
Figure 2A:
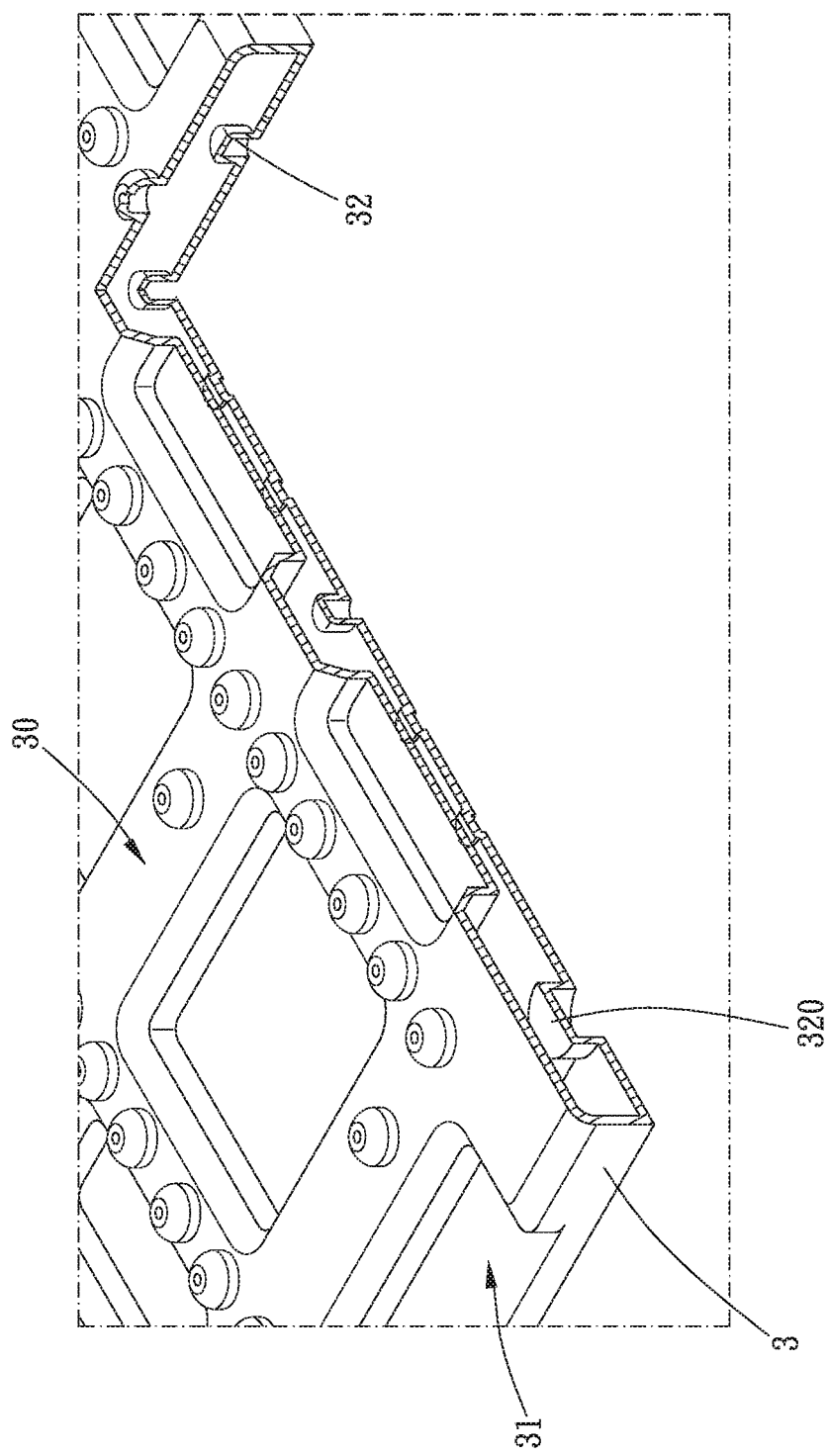
Figure 3:
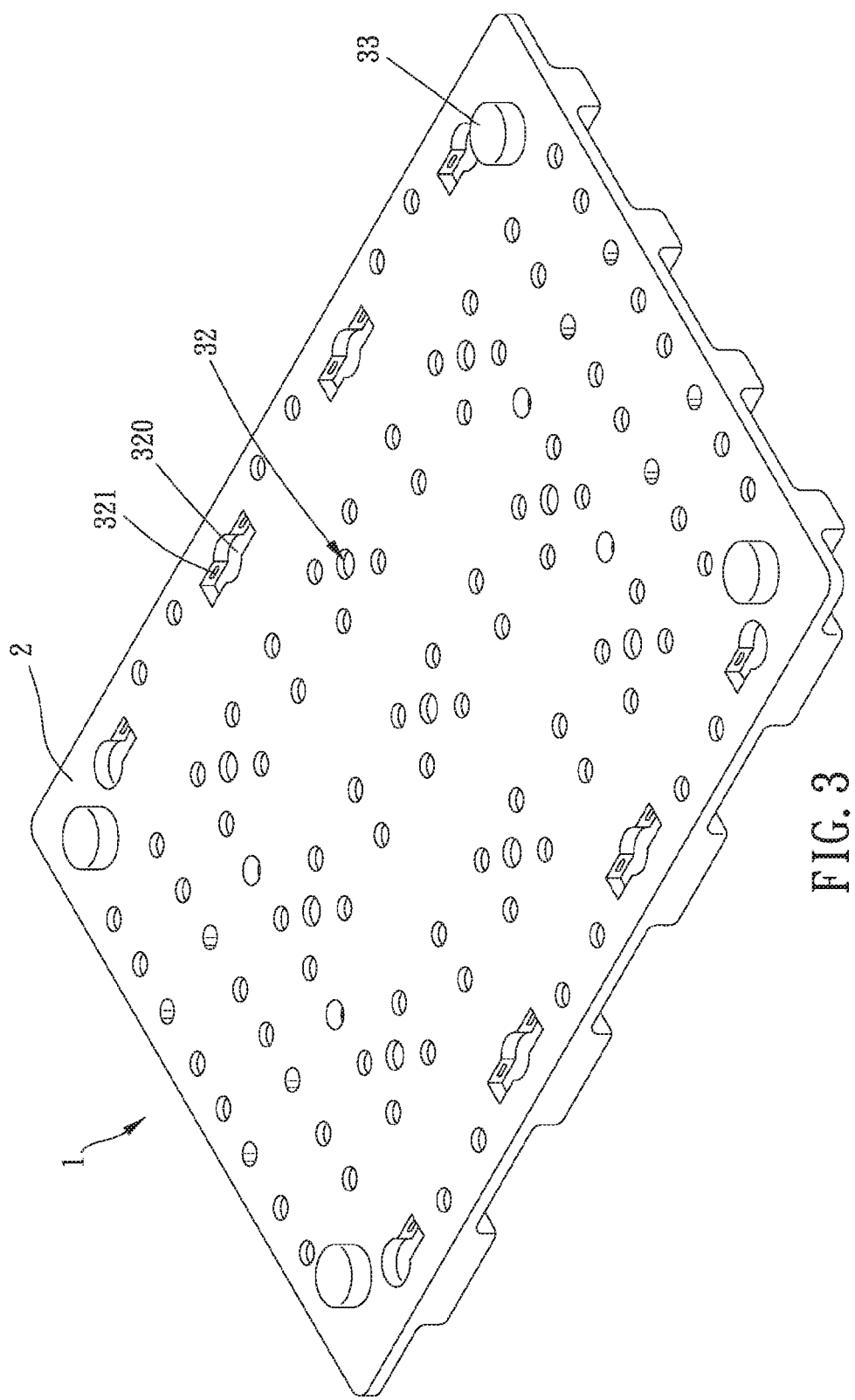
FIG. 3 is a drawing of the preferred embodiment of the present invention from another perspective.
Figure 4:
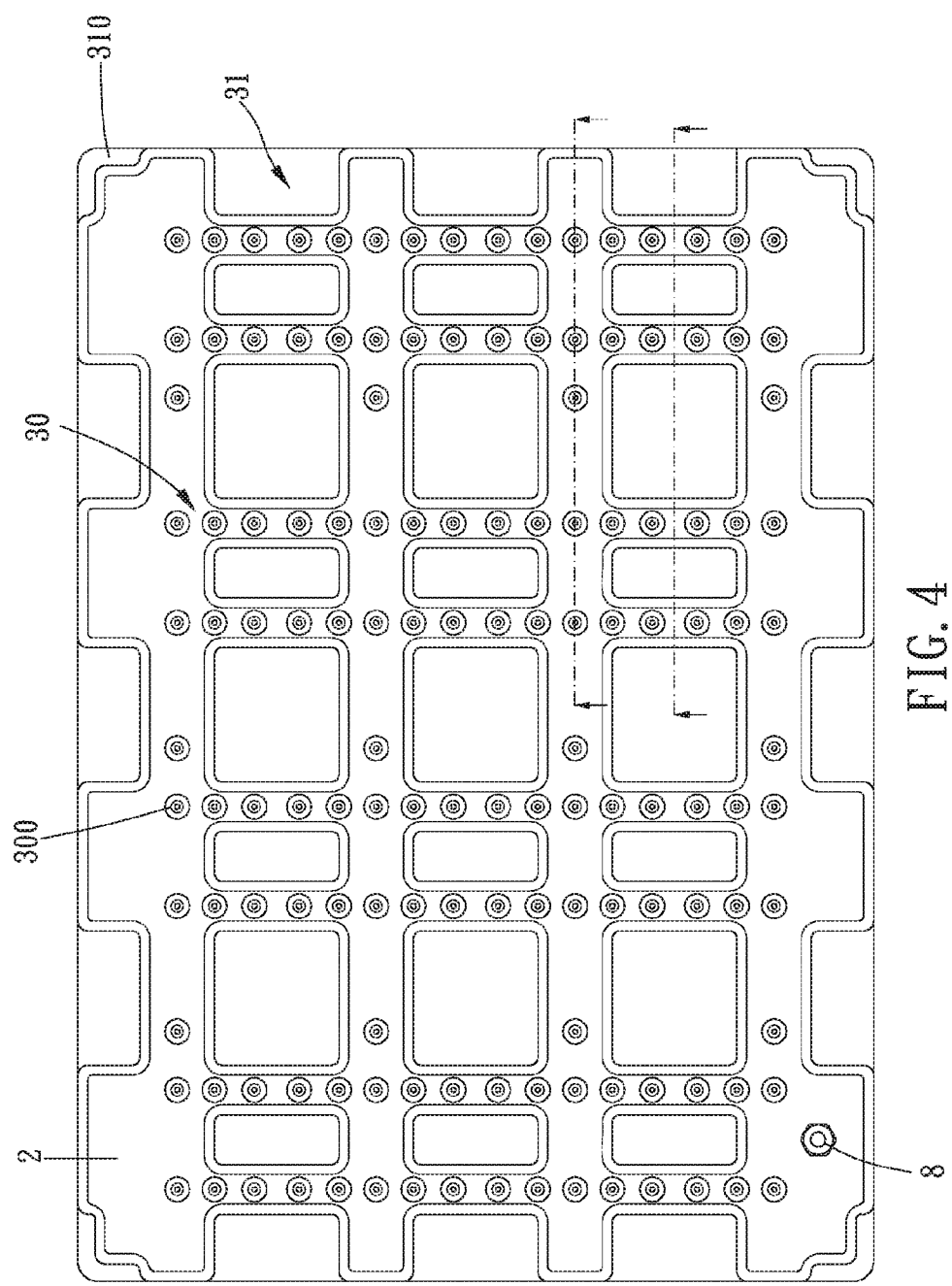
FIG. 4 is a drawing of the preferred embodiment of the present invention from another perspective.
Figure 5:
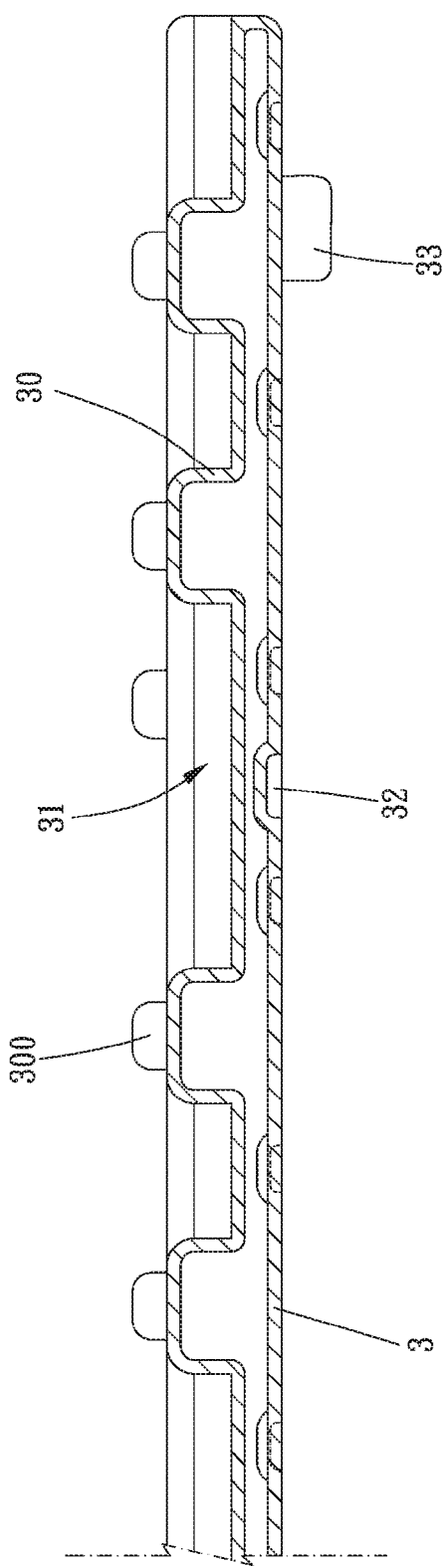
FIGS. 5 and 6 are partially cross-sectional view of FIG. 4.
Figure 6:
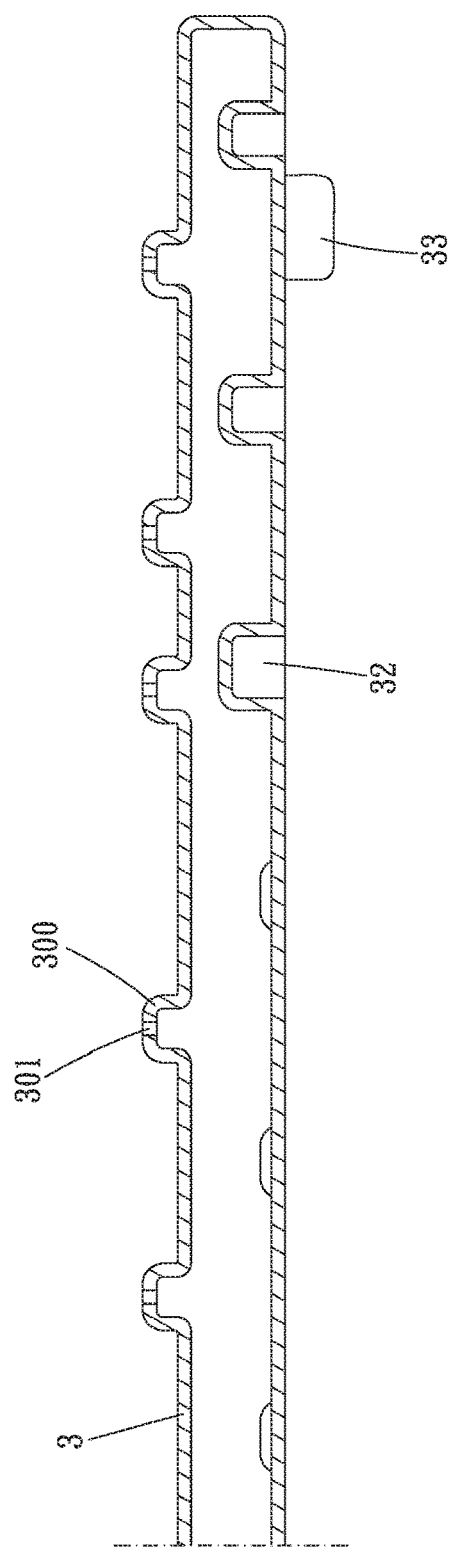

The present invention will be clearer from the following description when viewed together with the accompanying drawings, which show, for purpose of illustrations only, the preferred embodiment in accordance with the present invention.

Please refer to FIGS. 1 to 12 for a preferred embodiment of the present invention. A blow-molding plastic bubble-generating device 1 includes a board-like shell body 2. The board-like shell body 2 is formed through blowing a hollow embryo 11 placed in a mold 12, wherein the hollow embryo 11 is blown and expanded, the hollow embryo 11 is penetrated through by a plurality of needle posts 13 on an inner wall of the mold 12 to form the board-like shell body 2, the board-like shell body 2 is integrally formed and hollow and has a shell wall 3 which completely and continuously surrounds the board-like shell body 2, and the shell wall 3 has a plurality of through holes 301. The blow-molding plastic bubble-generating device 1 can be placed in a container which contains liquid and connected to an air supply device 100, and the through bubbles jetted out from the through holes 301, dirt on an object can be quickly removed, and the object can be quickly and deeply cleaned.

In this embodiment, the shell wall 3 has a plurality of protrusive mouths 300, and each said protrusive mouth 300 has one of the through holes 100. The shell wall 3 has a plurality of lattice ribs 30, each said lattice rib 30 is hollow, and a top face of the lattice rib 30 has a plurality of protrusive mouths 300. The plurality of lattice ribs 30 include a plurality of first protrusive ribs 302 and a plurality of second protrusive ribs 303, the first protrusive rib 302 is parallel to a longitudinal direction of the board-like shell body 2, the second protrusive rib 303 is parallel to a latitudinal direction of the board-like shell body 2, and the plurality of first protrusive ribs 302 and the plurality of second protrusive ribs 303 crisscross with each other and define a plurality of recessed grooves 31. Through the plurality of lattice ribs 30, the plurality of protrusive mouths 300 and the plurality of through holes 301, a volume of a space for air to pass through decreases gradually from bottom to top to increase air pressure so that the bubbles jetted from the through holes 301 can be stronger and in a great number to improve a cleaning effect. In addition, the recessed grooves 31 largely decreases a volume of the board-like shell body 2 so that the blow-molding plastic bubble-generating device 1 can disperse air evenly and quickly through the lattice ribs 300 to each said protrusive mouth 300 without inletting a large amount of air, and the lattice ribs 30 helps to elevate a structural strength of the shell wall 3.

A side of the shell wall 3 opposite to the plurality of lattice ribs 30 has a plurality of recesses 32, and the plurality of recesses 32 correspond to at least one of the lattice ribs 30 or at least one of the recessed grooves 31. The recessed groove 31 corresponds to a part of the plurality of recesses 32, and at least one of the lattice ribs 30 corresponds to a part of the plurality of recesses 32. The part of the plurality of recesses 31 corresponding to one of the recessed groove 31 is shallower than the part of the plurality of recesses 32 corresponding to the at least one of the lattice ribs 30. Each said recess 32 has different depths according to different corresponding structures so as to elevate a structural strength of the board-like shell body 2 (for example, when a water pressure is high, the board-like shell body 2 is strongly squeezed. At this moment, each said recess 32 can support each said recessed groove 31 or each said lattice rib 30 to prevent an air circulation in the board-like shell body 2 from being influenced when the shell wall 3 is deformed), to decrease the volume of the board-like shell body 2 and to split air flow to disperse air more quickly. A part of the plurality of recesses 32 are arranged along a periphery of the board-like shell body 2 to define an engaging groove 320, each said engaging groove 320 includes two restricting protrusions 321 (may be at least one) which project into the engaging groove 320, each said engaging groove 320 corresponds to one of the lattice ribs 30, and each said engaging groove 320 can be for making the board-like shell body 2 fixed on a platform which has a protrusive abutting structure. A side of the shell wall 3 opposite to the plurality of lattice ribs 30 has a plurality of abutting protrusions 33, each said abutting protrusion 33 is close to a corner of the board-like shell body 2, and each said abutting protrusion 33 is for the board-like shell body 2 to be placed on a platform stably.

Figure 10:
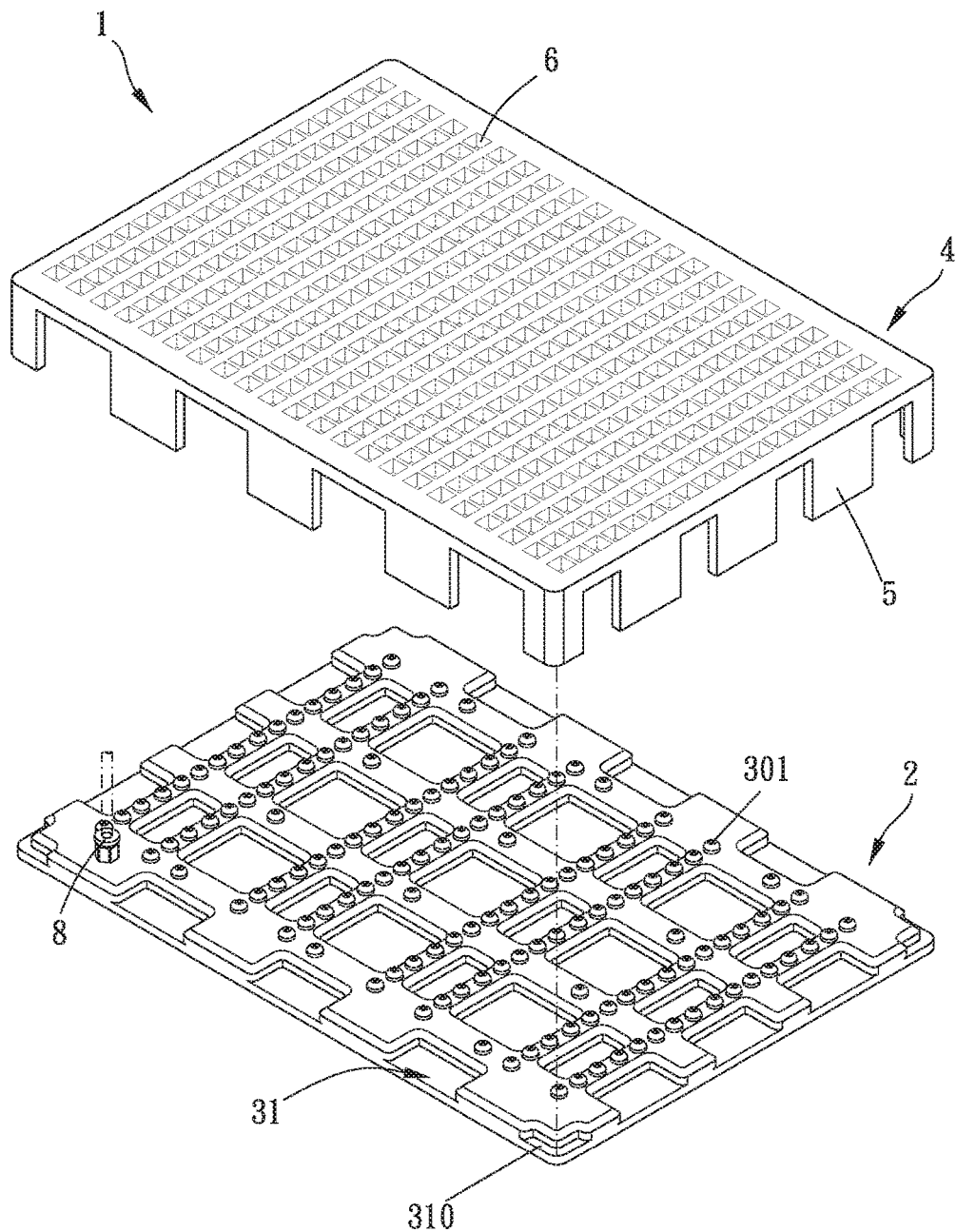
FIG. 10 is a perspective view of the preferred embodiment of the present invention.
Figure 11:
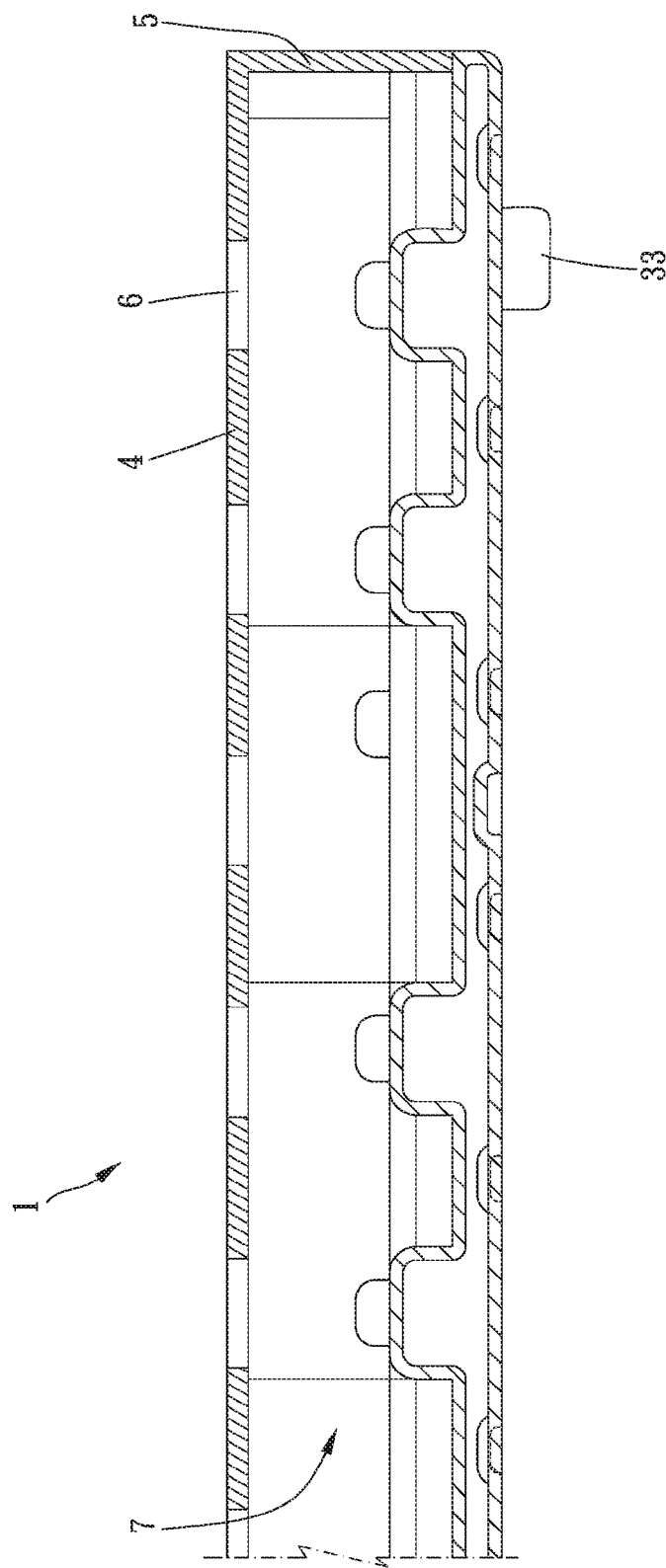
FIG. 11 is a partially cross-sectional view of the preferred embodiment of the present invention.

Please refer to FIGS. 10 to 12. In this embodiment, the blow-molding plastic bubble-generating device 1 further has an air inlet mouth 8 which communicates with an interior of the board-like shell body 2 and includes a pallet 4. The air inlet mouth 8 is for being connected to the air supply device 100. The pallet 4 includes a plurality of props 5 and has a plurality of penetrating holes 6 disposed therethrough, the pallet 4 is detachably assembled on the board-like shell body 2 and defines a space 7 with the board-like shell body 2, the space 7 communicates with the plurality of through holes 301 and the plurality of penetrating holes 6, the pallet 4 can separate an object to be cleaned to prevent the object to be cleaned from clogging each said through hole 301, and the four L-shaped chamfered grooves 310 are respectively arranged on four corners of the board-like shell body 2 and open laterally. A part of the plurality of the recessed grooves 31 are respectively spacingly arranged along four sides of the board-like shell body 2 and open laterally, and each said L-shaped chamfered groove 310 and a part of the plurality of recessed grooves 31 mentioned above are for the props 5 of the pallet 4 to be placed thereon so that the pallet 4 can be stably placed on the board-like shell body 2.

In actual use, when cleaning the object, adding additional bubbles helps to increase a cleaning efficiency, impact of the bubbles can remove the dirt on the surface or in the gap of the object so as to clean the object more thoroughly, air enters the board-like shell body 2 through the air inlet device 100, after air disperses toward each said protrusive mouth 300 and each said through hole 301, air in each said protrusive mouth 300 has a higher pressure, and the bubbles are jetted out from the through hole 301. The blow-molding plastic bubble-generating device 1 can be put into a cleaning container and connected with the pallet 4, and it is understandable that the board-like shell body 2 may be used alone without cooperating with the pallet 4.

In other embodiments, according to various requirements, the shell wall of the board-like shell body may have other uneven structures to elevate an efficiency of the blow-molding plastic bubble-generating device; the blow-molding plastic bubble-generating device may be connected to an air supply device which is for providing special gases, for example but not limited to, ozone; the lattice rib of the board-like shell body may be in other modes, for example but not limited to, strip protrusive ribs which are arranged in parallel or in radiation, so that the shell wall has sufficient structural strength to enhance the air pressure jetted from the through holes; the blow-molding plastic bubble-generating device may be used in, for example but not limited to, an aquarium to provide air into a liquid; the blow-molding plastic bubble-generating device may be connected with a box which has an upper lid, a liquid which has a cleaning function is received in the box, and the object to be cleaned is put in the box to be cleaned automatically so that the user does not have to wash the object personally.

Figure 9:
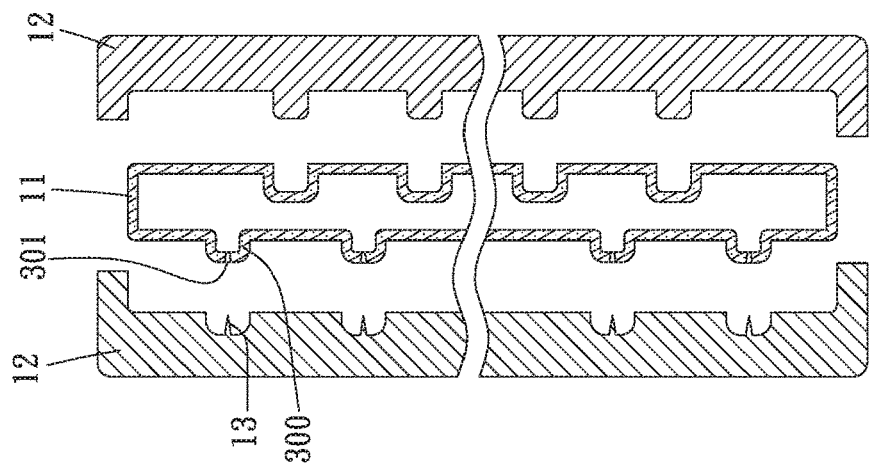
FIGS. 7 to 9 are drawings showing a method of manufacturing a plastic bubbling board of the preferred embodiment of the present invention.
Figure 8:
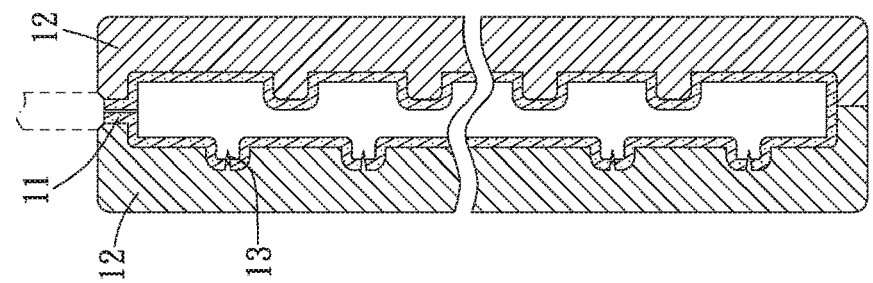
Figure 7:
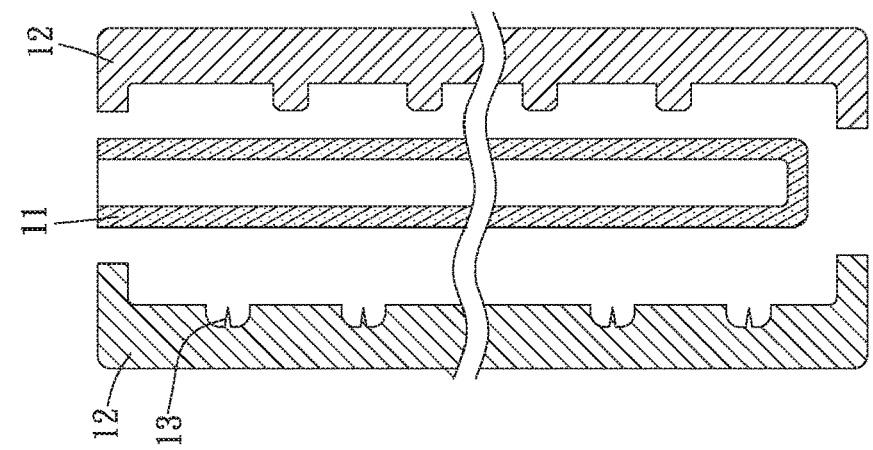

Please refer to FIGS. 7 to 9. In this embodiment, a method for manufacturing a plastic bubbling board is provided for manufacturing the board-like shell body mentioned above, a hollow embryo 11 is placed in a mold 12, an inner wall of the mold 12 has a plurality of needle post 13 for producing the through holes, the hollow embryo 11 is blown so that hollow embryo 11 is expanded to contact the inner wall of the mold 12 and penetrated through by a plurality of needle posts 13 to form the board-like shell body, and after the board-like shell body is formed, just separate the board-like shell body and the mold 12. Then, the plastic bubbling board is completed.

The board-like shell body is formed through blow-molding, so a cost can be effectively decreased (a blow-molding mold is made of a negative mold, and after cooling, a product can be used immediately without going through snap-fit or welding, so the costs of the mold and the manufacturing process can saved), it is easy for the user to adjust a thickness of the shell wall according to various needs, and the board-like shell body has a more preferable performance (the products which is made through blow-molding has a smaller residual stress, so it is more impact-resistant and flexible).

Given the above, the blow-molding plastic bubble-generating device can produce a large amount of strong and fast bubbles to increase the cleaning efficiency, and the blow-molding plastic bubble-generating device has a stable structure, so air can be appropriately split and dispersed. Through the method for manufacturing a plastic bubbling board, it is cost-saving, convenient and quick to manufacture the plastic bubbling board which has a more preferable performance.

While we have shown and described various embodiments in accordance with the present invention, it should be clear to those skilled in the art that further embodiments may be made without departing from the scope of the present invention.

What is claimed is:

1. A blow-molding plastic bubble-generating device, including: a board-like shell body, formed through blowing a hollow embryo placed in a mold, wherein the hollow embryo is blown and expanded, the hollow embryo is penetrated through by a plurality of needle posts on an inner wall of the mold to form the board-like shell body, the board-like shell body is integrally formed and hollow and has a shell wall which completely and continuously surrounds the board-like shell body, and the shell wall has a plurality of through holes; wherein the shell wall has a plurality of protrusive mouths, and each said protrusive mouth has one of the through holes.

2. The blow-molding plastic bubble-generating device of claim 1, wherein the shell wall has a plurality of lattice ribs, each said lattice rib is hollow, and a top face of the lattice rib has a plurality of protrusive mouths.

3. The blow-molding plastic bubble-generating device of claim 2, wherein the plurality of lattice ribs include a plurality of first protrusive ribs and a plurality of second protrusive ribs, and the plurality of first protrusive ribs and the plurality of second protrusive ribs crisscross with each other and define a plurality of recessed grooves.

4. The blow-molding plastic bubble-generating device of claim 3, wherein a side of the shell wall opposite to the plurality of lattice ribs has a plurality of recesses, and the plurality of recesses correspond to at least one of the lattice ribs or at least one of the recessed grooves.

5. The blow-molding plastic bubble-generating device of claim 4, wherein one of the recessed groove corresponds to a part of the plurality of recesses, and at least one of the lattice ribs corresponds to a part of the plurality of recesses.

6. The blow-molding plastic bubble-generating device of claim 5, wherein the part of the plurality of recesses corresponding to one of the recessed groove is shallower than the part of the plurality of recesses corresponding to the at least one of the lattice ribs.

7. The blow-molding plastic bubble-generating device of claim 4, wherein a part of the plurality of recesses are arranged along a periphery of the board-like shell body to define an engaging groove, and each said engaging groove includes at least one restricting protrusion which projects into the engaging groove.

8. The blow-molding plastic bubble-generating device of claim 2, wherein a side of the shell wall opposite to the plurality of lattice ribs has a plurality of abutting protrusions.

9. The blow-molding plastic bubble-generating device of claim 6, wherein a part of the plurality of recesses are arranged along a periphery of the board-like shell body to define an engaging groove, and each said engaging groove corresponds to one of the lattice ribs and includes two restricting protrusions which project into the engaging groove; a side of the shell wall opposite to the plurality of lattice ribs has a plurality of abutting protrusions, and each said abutting protrusion is close to a corner of the board-like shell body; the blow-molding plastic bubble-generating device further has an air inlet mouth which communicates with an interior of the board-like shell body; the plurality of recessed groove include four L-shaped chamfered grooves, the four L-shaped chamfered groove are respectively arranged on four corners of the board-like shell body and open laterally; a part of the plurality of the recessed grooves are respectively spacingly arranged along four sides of the board-like shell body and open laterally.

10. A blow-molding plastic bubble-generating device, including:
a board-like shell body, formed through blowing a hollow embryo placed in a mold, wherein the hollow embryo is blown and expanded, the hollow embryo is penetrated through by a plurality of needle posts on an inner wall of the mold to form the board-like shell body, the board-like shell body is integrally formed and hollow and has a shell wall which completely and continuously surrounds the board-like shell body, and the shell wall has a plurality of through holes;
a pallet, the pallet including a plurality of props and has a plurality of penetrating holes disposed therethrough, the pallet detachably assembled on the board-like shell body and defining a space with the board-like shell body, the space communicating with the plurality of through holes and the plurality of penetrating holes.

* * * * *